United States Patent [19]
Tomioka et al.

[11] Patent Number: 5,211,779
[45] Date of Patent: May 18, 1993

[54] METHOD OF FITTING PNEUMATIC TIRES FOR WET AND DRY ROAD CONDITIONS

[75] Inventors: Kiyoshi Tomioka; Susumu Watanabe, both of Hiratsuka; Tuneo Morikawa, Hadano, all of Japan

[73] Assignee: The Yokohama Rubber Co., Ltd., Tokyo, Japan

[21] Appl. No.: 598,304

[22] Filed: Oct. 16, 1990

[30] Foreign Application Priority Data

Oct. 30, 1989 [JP] Japan .................................. 1-279777

[51] Int. Cl.⁵ .............................................. B60C 11/11
[52] U.S. Cl. .............................. 152/209 R; 152/209 A
[58] Field of Search ........... 152/209 R, 209 D, 209 A

[56] References Cited

U.S. PATENT DOCUMENTS

| 4,732,194 | 3/1988 | Saneto et al. | 152/209 A |
| 4,747,436 | 5/1988 | Williams | 152/209 R |
| 4,877,072 | 10/1989 | Fontaine | 152/209 R |

FOREIGN PATENT DOCUMENTS 3301108 12/1988 Japan ............................. 152/209 A Primary Examiner—Caleb Weston
Assistant Examiner—Nancy T. Krawczyk
Attorney, Agent, or Firm—Nikaido, Marmelstein, Murray & Oram

[57] ABSTRACT

Tires each having a tread pattern comprising sub-grooves diagonally disposed in the same direction are fitted on the left- and right-hand sides of an automobile such that imaginary lines extending respectively from the sub-grooves of the left- and right-hand tires of the same axles intersect each other on the front side of the automobile for the dry road running, while the imaginary lines intersect each other on the rear side of the automobile for the wet road running.

3 Claims, 4 Drawing Sheets

METHOD OF FITTING PNEUMATIC TIRES FOR WET AND DRY ROAD CONDITIONS

BACKGROUND OF THE INVENTION

The present invention relates to a method of fitting pneumatic tires that improves the driving stability of an automobile in running the same on a dry road (hereinafter referred to as dry running) and on a wet road (hereinafter referred to as wet running).

Recently, demands for tires having higher performance and wider variety still continues to increase due to the expansion of expressway network to a full extent and due to the continuous improvement of the performance of passenger vehicles. For instance, all-season tires in which the inferiority of the wet running performance to the dry running one is small, tires employing a special belt material in order to improve riding comfort have been proposed.

It is known that the dry running performance, i.e., the dry running driving stability and the wet running performance, i.e., the wet running driving stability are in opposite relationship with each other, and that if one of these two performances is improved, the other performance lowers. Due to this fact, it is still impossible to provide a tire that can equally satisfy the above required performances.

The inventors of the present invention made various studies on how to improve both of the above two performances. It was found that it is when an automobile is run on a corner that the dry running and wet running driving stabilities are most evaluated, resulting in the present invention. Namely, when studying the functions of tires, the inventors did not consider a tire only, but intended to study and find the best functions exhibited by each tire while fitted to an automobile. In other words, the inventors intended to equally satisfy the above two performances by improving to a maximum extent a function of a tire that is considered most important in a certain condition.

SUMMARY OF THE INVENTION

An object of the present invention is to provide a method of fitting pneumatic tires that equally improves the dry running performance and the wet running performance.

Another object of the present invention is to provide a set of tires enabling consistency of the two performances, i.e., the dry running performance and the wet running performance.

A method of fitting pneumatic tires according to the present invention is characterized in that a tread pattern is formed in the tread surface of a tire by defining blocks by a plurality of annular straight grooves extending circumferentially in the tread surface of the tire within the ground-contacting width around the tire and disposing also a plurality of sub-grooves intersecting obliquely those straight grooves extending parallely in the widthwise direction of the tire and in that when tires having the tread pattern so formed are fitted on the left- and right-hand sides of an automobile, imaginary lines extending respectively from the sub-grooves of the left- and right-hand side tires confronting each other in the widthwise direction of the automobile as viewed from thereabove intersect each other on the front side of the automobile for dry road running, while the tires are fitted such that the imaginary lines intersect each other on the rear side for wet road running.

Each of four tires according to the present invention has a tread pattern formed in the tread surface thereof by defining blocks by a plurality of annular straight grooves extending circumferentially in the tread surface of the tire within the ground-contacting width thereof around the tire and disposing also a plurality of sub-grooves intersecting obliquely those straight grooves extending parallely in the widthwise direction of the tire and has words "WET" and "DRY" with arrows thereunder marked on side walls on the serial side indicating the rotational directions of the tire. The method of fitting the tires described above is characterized in that the directions indicated by the arrows under the "WET" and "DRY" are determined such that when the four tires are fitted to an automobile, imaginary lines extending respectively from the sub-grooves of the left- and right-hand side tires confronting each other in the widthwise direction of the automobile when viewed from thereabove intersect each other on the front side of the vehicle for the dry road running, while imaginary lines extending respectively from the sub-grooves of the left- and right-hand side tires intersect each other on the rear side of the automobile for the wet road running.

DETAILED DESCRIPTION OF THE PREFERRED EMBODIMENTS

Figure 1:
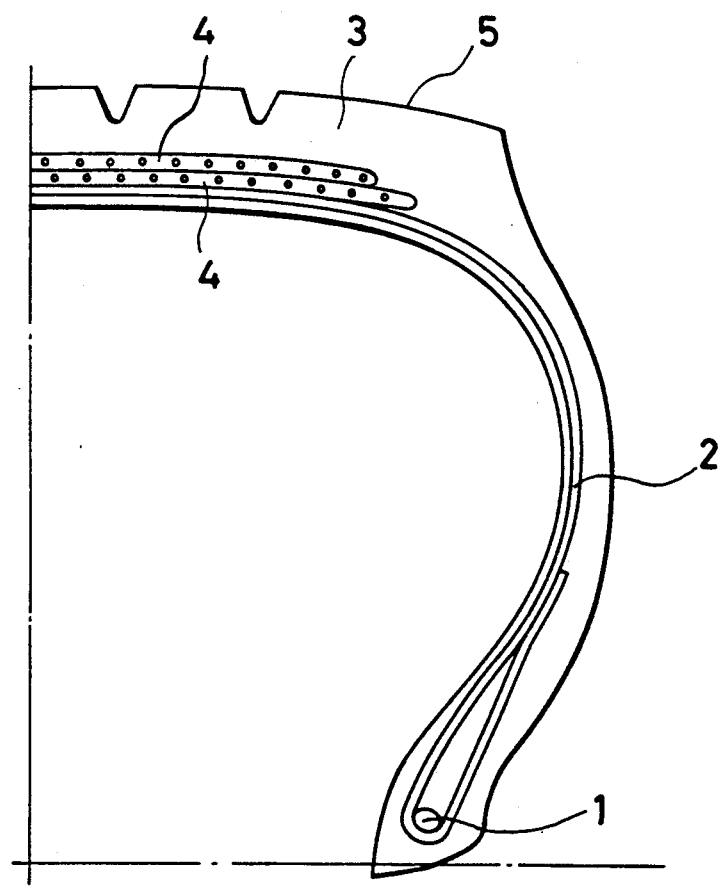
FIG. 1 is a cross-sectional explanatory view, showing a half of an example of pneumatic tires according to the present invention that is cut in the direction of a meridian.

A pneumatic tire according to the present invention is for example a pneumatic radial tire as shown in FIG. 1. A carcass layer 2 is mounted on a pair of left and right bead cores 1, 1, and in a tread 3 two annular belt layers 4, 4 are disposed circumferentially around the tire in such a manner as to surround the outer circumference of carcass layer 2.

Organic fibers such as of nylon and polyester are used as a material for the carcass layer 2, and highly strong and rigid cords such as steel cords, Aramid cords (aromatic polyamide fiber cords) or the like are used as cords for the belt layer 4.

A belt cover layer (not shown) comprising nylon cords may be disposed on the outside of the outer belt layer 4 with a view to improving the high-speed running performance. The angle at which cords are disposed in this belt cover layer is substantially 0° (parallel) with respect to the circumferential direction of the tire.

Figure 2:
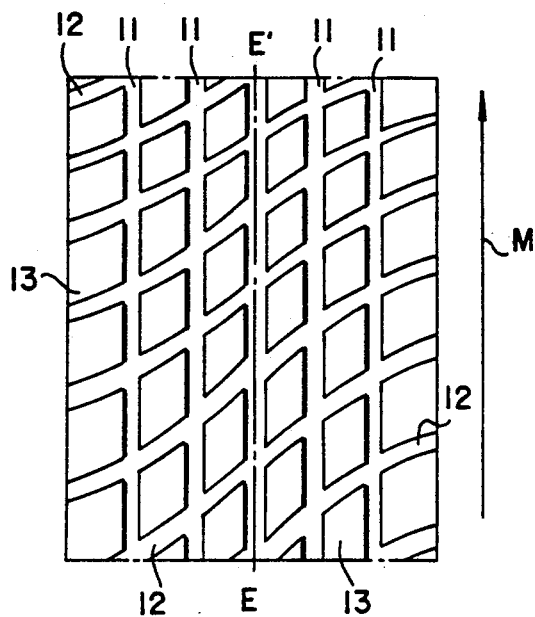
FIGS. 2 and 3 are explanatory views, showing an example of the tread patterns of the pneumatic tire according to the present invention.
Figure 3:
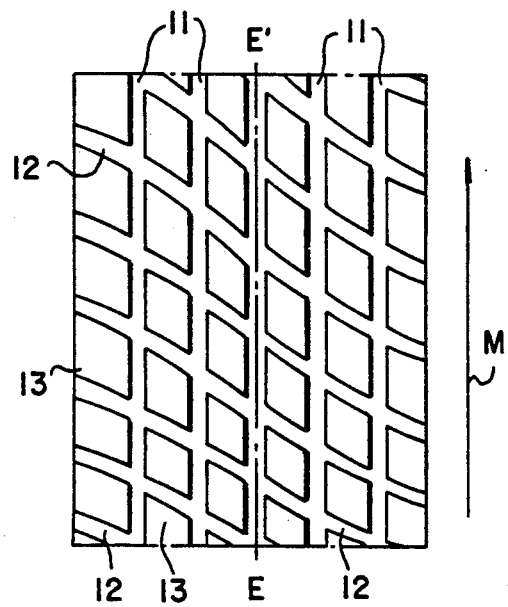

In a pneumatic tire according to the present invention, a tread pattern is formed by defining blocks by a plurality of annular straight grooves circumferentially extending around the tire in the surface of the tread 3, i.e., a tread surface 5 of the tire within the ground-contacting width (within the range from one of the shoulder portions to the other shoulder portion) thereof, and by disposing also a plurality of sub-grooves obliquely intersecting those straight grooves in the tread surface 5 of the tire in the widthwise direction thereof. FIGS. 2 and 3 show, respectively, examples of the tread pattern of tires actually fitted to an automobile when viewed from thereabove. In these figures, the reference numeral 11 denotes annular straight grooves provided in the circumferential direction EE' of the tire, the reference numeral 12 sub-grooves provided in the widthwise direction of the tire, and the reference numeral 13 denotes blocks defined by these grooves. In FIG. 12, the sub-grooves 12 are disposed in such a manner as to direct obliquely to the left with respect to the direction M in which the automobile moves, while in FIG. 3 the sub-grooves 12 are disposed in such a manner as to incline also diagonally but to the left with respect to the direction M in which the automobile moves. The tread pattern shown in FIG. 2 is hereinafter referred to as tread pattern A, while the tread pattern shown in FIG. 3 is hereinafter referred to as tread pattern B.

It is preferable that the direction in which cords are disposed in a belt layer closest to the tread surface 5 of the tire (outer belt layer 4) is inclined to the same direction in which the sub-grooves 12 are disposed with respect to the circumferential direction of the tire. This is because in a case where the sub-grooves and the cords of the outer belt layer 4 are declined in the same direction, the cords assist the sub-grooves 12 with rigidity and also serve to enhance the rigidity of the sub-grooves 12, improving the edge effect of the sub-grooves 12 to the road surface when running.

Figure 4:
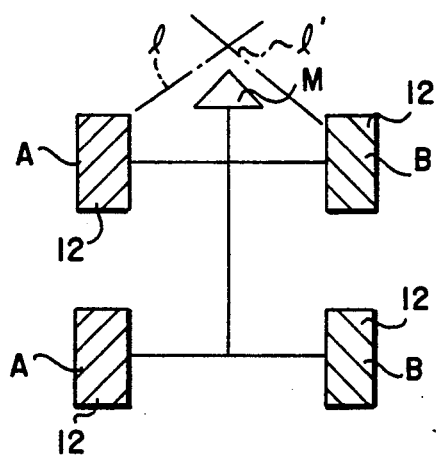
FIGS. 4 and 5 are explanatory views, showing arrangements of the pneumatic tires according to the present invention when the tires are fitted to an automobile, respectively.

(1) According to the present invention, as shown in FIG. 4, tires having the above-mentioned tread patterns A and B are fitted to an automobile such that imaginary lines l, l' extending respectively from the sub-grooves 12 of the left- and right-hand tires confronting each other intersect each other on the front side of the vehicle for the dry running when viewed from above the automobile. In other words, a pair of the sub-grooves 12 of the left and right tires on the same axles form an inverted "V" of the alphabet when viewed from above the automobile.

Since sub-grooves 12 are arranged such that they seem to form an inverted "V" when viewed from above the automobile, the sub-grooves 12 come to contact with the road surface such that they form a "V". When the automobile runs a corner, the direction of the sub-grooves 12 of the tires on the outer side of the curve with respect to the direction of the running of the automobile, namely, the tires on the left-hand side of the vehicle when it makes a right turn on a corner or the tires on the right-hand side of the vehicle when it makes a left turn on the corner becomes substantially parallel or close to the parallel angle (0°) with respect to the direction in which the automobile moves, whereby the rigidity of road contacting-surface of the tire with respect to the same direction is greatly enhanced. Since this makes it possible to increase the cornering force produced by the tires which are on the outer side of the curve and which receive the greatest load when the automobile runs a corner, it is possible to improve the dry running performance.

Figure 5:
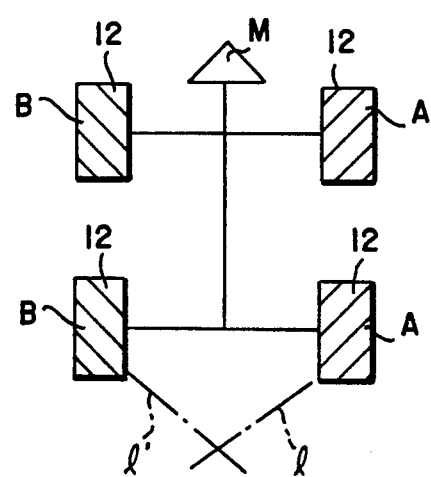

(2) Further, according to the present invention, as shown in FIG. 5, tires having the above-mentioned tread patterns A and B are fitted to an automobile such that imaginary lines l, l' extending respectively from the sub-grooves 12 of the left- and right-hand side tires confronting each other in the widthwise direction of the automobile when viewed from thereabove intersect each other on the rear side of the automobile during the wet running. In other words, the sub-grooves 12 of the left and right tires on the same axles form a "V" of the alphabet when viewed from above the automobile.

Since the sub-grooves 12 seem to form a "V" of the alphabet when viewed from above the automobile, the sub-grooves 12 come to contact with the road surface such that they form an inverted "V". Therefore, this allows water to be smoothly drained towards the inside of the automobile via the sub-grooves 12 of the tires which are on the outer side of the automobile when it runs a corner. Namely, when the automobile makes a right turn, the sub-grooves 12 of the tires fitted on the left-hand side of the automobile improve the drainage of water towards the inside of the automobile (direction towards the right-hand side of the automobile), while when the automobile makes a left turn, the sub-grooves 12 of the tires fitted on the right-hand side of the automobile improve the drainage of water towards the inside of the automobile (direction towards the left-hand side of the automobile). Further, since a plurality of annular straight grooves are also provided in the tread surfaces of the tires in the circumferential direction thereof, the tires exhibit far better draining capability. Therefore, it is possible to improve the wet running performance.

Figure 8:
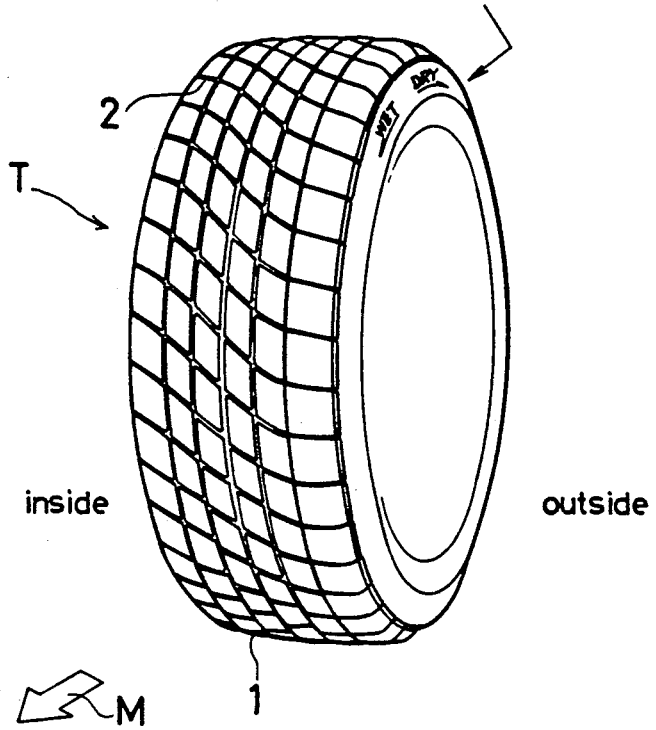
FIGS. 8 and 9 are explanatory perspective views of pneumatic tires according to the present invention.
Figure 9:
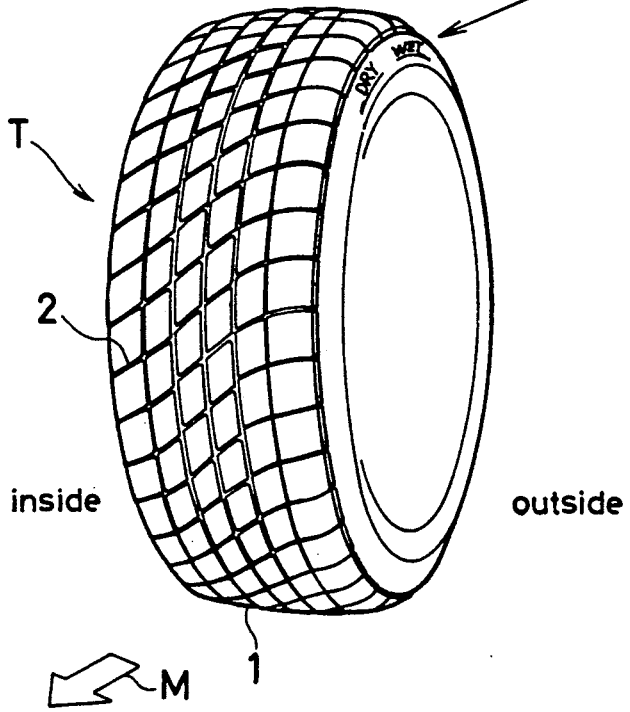

Moreover, the pneumatic tires according to the present invention, as shown in FIGS. 8 and 9 the tire T may be marked on the sidewall portion thereof with words "WET" and "DRY" and arrows thereunder indicating the rotational directions of the tire T so as to facilitate fitting the tire to the automobile. Namely, the tire T is marked with the words and arrows on the sidewall surfaces on the outer side (generally called a serial side) of the automobile when the tires are fitted to the automobile. When the tires are marked as described above, the tires can be easily fitted to the automobile for dry running so that as shown in FIG. 9, the direction of the "DRY" arrow may be the same as the direction M in which the automobile moves, and that the sidewall so marked may be on the outer side of the automobile. Similarly, for wet running, the tires can be easily fitted to the automobile so that the direction of the "WET" arrows may be the same as the direction M, as shown in FIG. 8, in which the automobile runs and that the sidewall so marked may be on the outer side of the vehicle.

Figure 6:
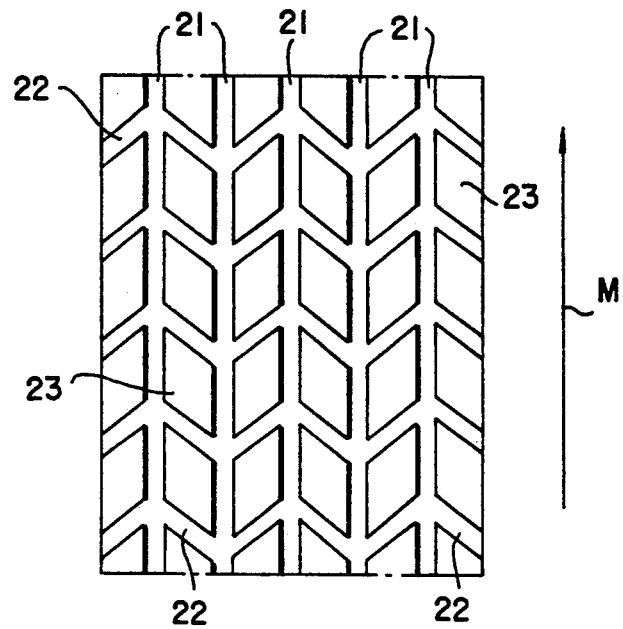
FIG. 6 is an explanatory view, showing an example of conventional tread patterns.
Figure 7:
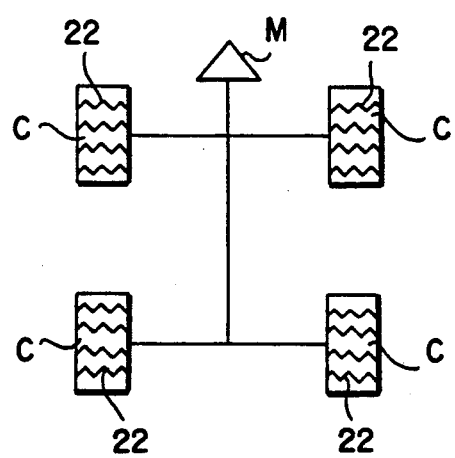
FIG. 7 is an explanatory view, showing an arrangement of conventional tires when they are fitted to an automobile.

For reference, FIG. 6 shows one example of a conventional tread pattern of a tire which is fitted to an automobile when viewed from above an automobile. In FIG. 6, wave-shaped sub-grooves 22 (neutral pattern) are formed in the widthwise direction of the tire, and these sub-grooves 22 are not arranged such that they are tilted downwardly towards the left- or right-hand side with respect to the direction M in which the automobile moves. The tread pattern shown in FIG. 6 is hereinafter referred to as tread pattern C. Tires having this tread pattern C are fitted to the vehicle as shown in FIG. 7. Thus, conventionally tires having neutral patterns are used so that the difference in the cornering force between a left turn and a right turn is made as small as possible. In other words, it has been preferable that every tire shows the same performance in any conditions. Due to this, it has not been possible to equally improve the dry running performance and the wet running performance as in the case of the present invention.

An example will be shown below.

EXAMPLE

Tires 1 to 5 having a tire size of 205/60 R 15 89H, shown in Table 1, were fitted to automobiles in accordance with arrangements shown in Table 2 (Automobiles I to V), and the dry running performance and the wet running performance were tested. Test results are shown in the form of index in Table 2.

Method of Evaluating Dry Running Performance

Two professional test drivers carried out ordinary driving stability feeling tests. The test results are shown in the form of indes, taking the results of Automobile V as 100 (greater indexes show better results).

Method of Evaluating Wet Running Performance

The automobiles were driven on a circular course with a radius of 100 m having a certain wet area with a water depth of 5 mm. The speed of the automobiles were gradually increased and lateral acceleration in the wet area were measured. The results are shown in the form of index, taking the results of Automobile V as 100 (greater indexes show better results).

TABLE 1

|  | Tire 1 | Tire 2 | Tire 3 | Tire 4 | Tire 5 |
|---|---|---|---|---|---|
| Thread Pattern | B | B | A | A | C |
| Carcass Layer | Material 1000 d/2 polyester, 2 layers | same as Tire 1 | same as Tire 1 | same as Tire 1 | same as Tire 1 |
|  | Cord Angle 90° to Circumferential Direction | same as Tire 1 | same as Tire 1 | same as Tire 1 | same as Tire 1 |
| Belt Layers |  |  |  |  |  |
| First Belt Layer (Inner) | Material 1 × 5 (0.25) Steel Cord 40 E | same as Tire 1 | same as Tire 1 | same as Tire 1 | same as Tire 1 |
|  | Cord Angle 20° to Circumferential Direction (down to the right) | same as Tire 1 (down to the left) | same as Tire 1 (down to the left) | same as Tire 1 (down to the right) | same as Tire 1 (down to the right) |
| Second Belt Layer (Outer) | Material 1 × 5 (0.25) Steel Cord 40 E | same as Tire 1 | same as Tire 1 | same as Tire 1 | same as Tire 1 |
|  | Cord Angle 20° to Circumferential Direction (down to the left) | same as Tire 1 (down to the right) | same as Tire 1 (down to the right) | same as Tire 1 (down to the left) | same as Tire 1 (down to the left) |

TABLE 2

|  | Automobiles | | | | |
|---|---|---|---|---|---|
|  | I | II | III | IV | V |
| Arrangement of Tires on Automobiles | Tire 3 on left side and Tire 1 on right side, (FIG. 4) | Tire 1 on left side and Tire 3 on right side, (FIG. 5) | Tire 4 on left side and Tire 2 on right side, (FIG. 4) | Tire 2 on left side and Tire 4 on right side, (FIG. 5) | Tire 5 on both left side and right side, (FIG. 6) |
|  | relative to moving direction of automobile | | | | |
| Dry Running Performance | 105 | 95 | 106 | 101 | 100 |
| Wet Running Performance | 102 | 106 | 103 | 107 | 100 |

As will be seen from the above Table 2, Automobiles I and III are superior to Automobile V in regard to the dry running performance and that Automobiles II and IV are superior to Automobile V in regard to the wet running performance.

As described above, according to the present invention, since imaginary lines extending respectively from the sub-grooves of the left- and right-hand side tires of the same axle are made to intersect each other on the front side of the automobile for the dry road running, while those imaginary lines are made to intersect each other on the rear side of the automobile for the wet road running, not only the dry running performance but also the wet running performance can be sufficiently improved. In particular, the present invention is suitable for fitting pneumatic radial tires.

What is claimed is:

1. A method of fitting right and left handed pneumatic tires to a vehicle, said tires having a tread pattern defined by a plurality of annular straight grooves extending over a whole circumference of each tire within a ground-contacting width of a tread surface thereof and a plurality of sub-grooves inclined obliquely to said straight grooves in the width direction and intersecting said straight grooves, all of said sub-grooves extending across the entire tread surface of each tire at a same direction of inclination relative to the tire circumferential direction, said sub-grooves in a ground-contacting surface of the tread of said right handed tire are directed obliquely to the right of a direction of travel and said sub-grooves in a ground-contacting surface of the tread of said left handed tire are directed obliquely to the left of a direction of travel, said method comprising the steps of:

mounting the tires such that imaginary lines in the direction of sub-grooves at a ground-contacting tread surface of left- and right-hand tires confronting each other in the widthwise direction of the vehicle when viewed from above intersect each other solely in a direction toward a front of said vehicle in the direction of travel when a road surface is dry;

removing the tires from the vehicle and remounting the tires in a reverse manner such the imaginary lines intersect each other solely in a direction toward the rear of said vehicle when the road surface is wet; and repeating the previous steps as appropriate upon each change of road surface condition to achieve optimum running performance of said tires.

2. A method according to claim 1, wherein the preparing step further includes setting a direction in which cords are disposed in a belt layer closest to the tread surface of the tire to be inclined in the same direction in which said sub-grooves are disposed with respect to the circumferential direction of the tire.

3. A method according to claim 1, wherein said preparing step further includes the step of marking the tires on the sidewall thereof with words "DRY" and "WET" and arrows under said words indicating the direction of rotation of said tires under each such road surface condition to achieve optimum running performance under such conditions.

* * * * *